Jan. 2, 1934.  W. L. HIGLEY  1,941,745
MEASURING DISPENSING BOWL OR RECEPTACLE
Filed Dec. 7, 1932  2 Sheets-Sheet 2
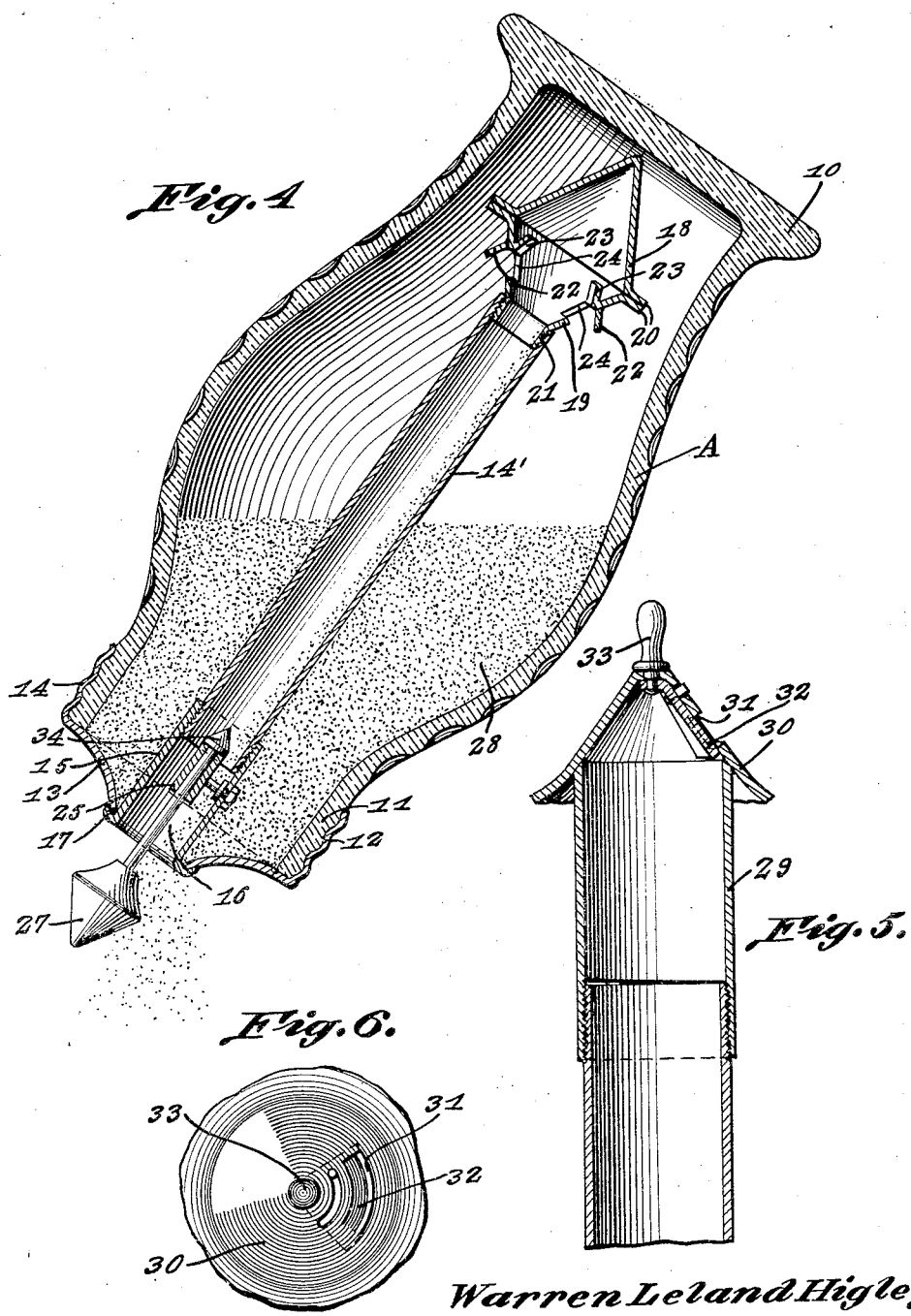
Warren Leland Higley,
INVENTOR
BY Victor J. Evans & Co.
ATTORNEY Patented Jan. 2, 1934

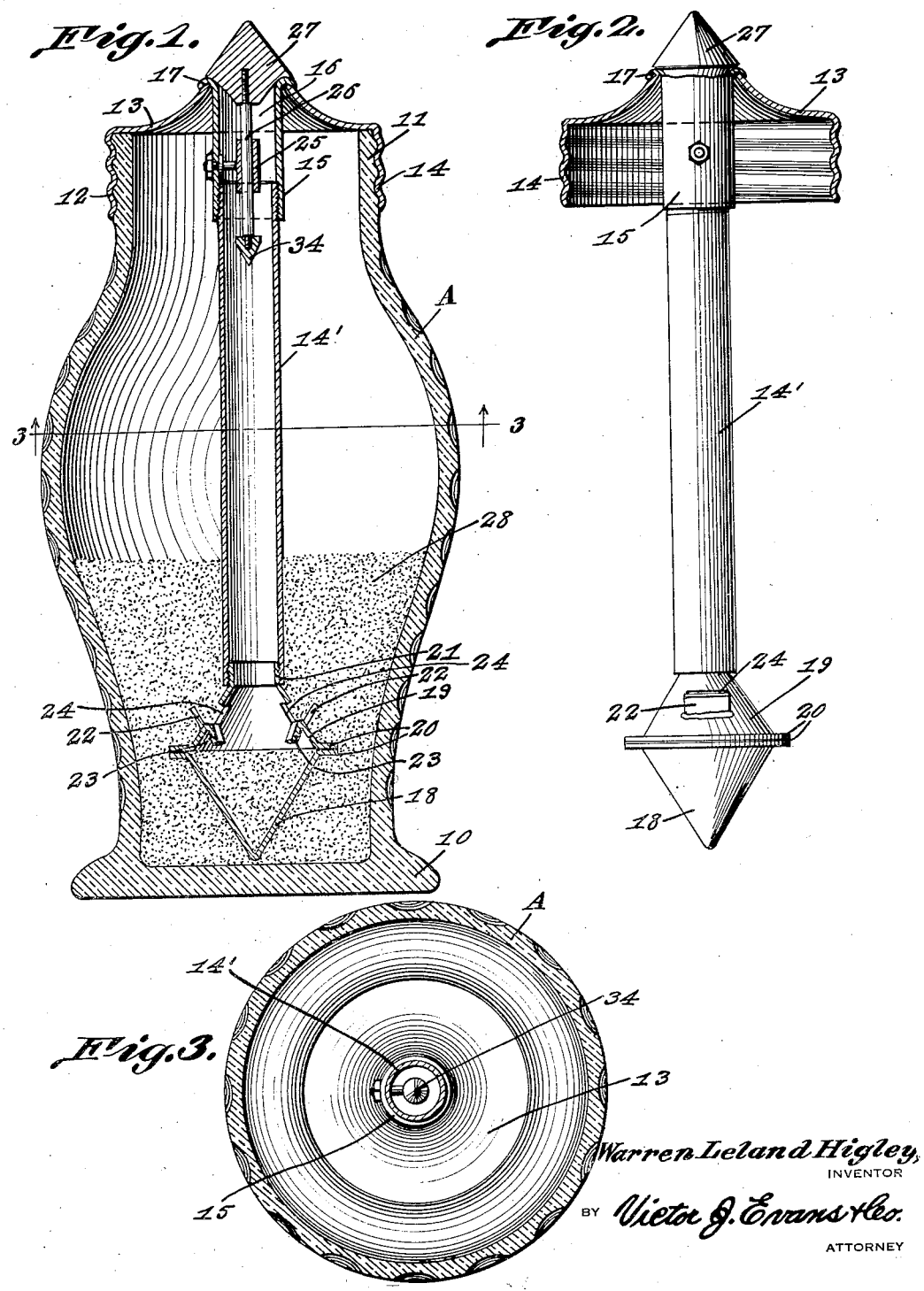

1,941,745

UNITED STATES PATENT OFFICE 1,941,745

MEASURING DISPENSING BOWL OR RECEPTACLE

Warren Leland Higley, Tampa, Fla.

Application December 7, 1932. Serial No. 646,187

2 Claims. (Cl. 221—98)

The invention relates to a dispensing receptacle and more especially to a measuring dispensing bowl or receptacle for sugar or other granulated substances.

The primary object of the invention is the provision of a bowl or receptacle of this character, wherein a dispensing column is located therein and is equipped with a trap for the reception of a determined quantity of the contents of the bowl or receptacle so that upon the tilting of the latter this determined quantity will be conveniently dispensed, the bowl or receptacle being especially designed for containing sugar and to facilitate the dispensing of the same.

Another object of the invention is the provision of a bowl or receptacle of this character, wherein its construction renders it useful in cafes, restaurants and for home use and also will eliminate the unsanitary condition surrounding the discharge mouth, it being airtight at all times except when in use and automatically serves sugar in a fixed quantity, while the fluidity of the sugar will be assured due to the fact that moisture is excluded from the bowl or receptacle and the dispensing of the contents is had by the tilting of such bowl or receptacle.

A further object of the invention is the provision of a bowl or receptacle of this character which is extremely simple in construction, thoroughly reliable and efficient in its purpose, neat and attractive in appearance, readily and easily operated for dispensing purposes, thoroughly sanitary, possessing but few parts, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a vertical sectional view through a bowl or receptacle constructed in accordance with the invention.

Figure 2 is an elevation of the dispensing means of such bowl or receptacle.

Figure 3 is a sectional view on the line 3—3 of Figure 1 looking in the direction of the arrows.

Figure 4 is a view similar to Figure 1 showing the bowl or receptacle tilted or upset for the dispensing of a quantity of its contents.

Figure 5 is a fragmentary sectional view of a slight modification of dispensing means.

Figure 6 is a top plan view thereof.

Similar reference characters indicate corresponding parts throughout the several views in the drawings.

Referring to the drawings in detail, A designates generally a container which constitutes the bowl or receptacle and in this instance is shown made from glass, although it may be made from any other suitable material and is preferably of the shape as disclosed in Figure 1 of the drawings. The body of the container A has a base 10 forming the closed bottom thereof, while the upper open end constitutes a neck 11 having external screw threads 12 for the detachable engagement thereon of a removable cap 13, the flange 14 of which is correspondingly threaded to the neck 11 so that this cap 13 can be screwed on and from the open end of the container in the filling of said container.

Opening through the center of the cap 13 and depending within the container A is a tubular dispensing column 14' having at its outer or upper end a separable nozzle 15 to provide a discharge mouth 16 thereto, the nozzle 15 being formed with the outwardly curled edge 17 suitably joined with the cap concentrically with respect to the opening centrally therein for accommodating said nipple and these in this manner being unitary.

Connected with the dispensing column 14' is a measuring trap made from the reversely arranged conical sections 18 and 19 respectively, these being united at the joining flanges 20 thereof, the section 19 being formed with a connecting nipple 21 threaded into the column 14' for the detachable joining thereof. The section 19 has cut and bent therefrom the outward angularly disposed guards 22 and the inner angularly disposed guards 23 respectively. These guards are associated with the openings 24 which permit the contents of the container A to flow into the trap when said container is at rest and in upright position. The guards 22 function to prevent an excessive amount of the contents of the container A flowing into the trap and especially when the container is full and inverted or top tilted downwardly, while the guards 23 function to prevent the contents of the trap from escaping back into the container A when the bowl is tilted or inverted. The inner guards are cut and turned in from the upper portion or section 19 while the outer guards are at the base of the holes and are separately affixed pieces of material. The trap at the section 18 constitutes a measuring medium for a determined quantity of the contents of the container A.

Secured within the nozzle 15 is a sleeve-like center guide 25 for the stem 26 of a closure 27, the latter functioning as a valve to close the mouth of the nozzle 15 when the container A is at rest and on the tilting of such container the said closure 27 becomes unseated at the mouth of the nozzle 15 to open the same and the contents of the trap will be dispensed from the column 14' and nozzle 15 to without the bowl or receptacle.

The bowl or receptacle is designed especially for sugar 28 of the granulated kind.

It should be apparent that in the use of the bowl or receptacle a determined quantity of the sugar 28 can be conveniently dispensed therefrom when such bowl or receptacle is top tilted and on the bringing of the bowl or receptacle to rest position in its normal upright condition the closure 27 will seal the nozzle 15 to exclude moisture from entrance thereto and also assure sanitation to the contents thereof. In Figures 5 and 6 of the drawings there is shown a slight modification, wherein the nozzle 29 has integrally formed at its mouth the conical tip or head 30 provided with a dispensing opening 31 therein. This opening 31 is closed by a shutter or slide 32 connected with a turn knob 33 journaled in the apex of the tip or head 30, the knob 33 being manually operated for controlling the opening 31 as should be obvious and in this arrangement it is necessary to manually open the head 30 for the dispensing of sugar 28 from the column 14' while in the other form of closure 27 the manual actuation thereof is eliminated as it will automatically open on the tilting of the bowl or receptacle.

The stem 26 of the closure 27 has at its inner end a stop 34 which limits the outward sliding of the stem in the guide 25 as will be apparent and likewise limits the opening movement of said closure.

What is claimed is:

1. A device of the character described comprising a container adapted to contain a dispensing substance, a cap on the container and having a central dispensing column opening therethrough, a measuring trap arranged within the container and communicating with the column and said container, a head on the outer end of the column and having a dispensing opening, a shutter controlling said opening, and a turning knob fitted with the head and carrying the shutter for the manual operation thereof.

2. A device of the character described comprising a container adapted to contain a dispensing substance, a cap on the container and having a central dispensing column opening therethrough, a measuring trap arranged within the container and communicating with the column and said container, a closure at the outer end of the column for opening and closing the same, a stem on said closure, and a guide within the column and slidably receiving the stem.

WARREN LELAND HIGLEY.